April 5, 1966 G. D. CHENEY ET AL 3,245,063

MAGNETIC TRANSDUCER HEAD ASSEMBLIES

Filed Oct. 2, 1961 2 Sheets-Sheet 1

INVENTORS
GEORGE D. CHENEY,
DONN F. MOORE &
CLAUDE A. PATALIDIS
BY Bower & Patalidis
ATTORNEYS

INVENTORS
GEORGE D. CHENEY,
BY DONN F. MOORE &
CLAUDE A. PATALIDIS

Bower & Patalidis
ATTORNEYS

United States Patent Office 3,245,063

Patented Apr. 5, 1966

3,245,063
MAGNETIC TRANSDUCER HEAD ASSEMBLIES

George D. Cheney, Orchard Lake, Donn F. Moore, Detroit, and Claude A. Patalidis, Southfield, Mich., assignors to Ex-Cell-O Corporation, Detroit, Mich., a corporation of Michigan Filed Oct. 2, 1961, Ser. No. 142,148
10 Claims. (Cl. 340—174.1)

The present invention relates in general to new and improved magnetic transducer head assemblies, and more particularly to means of mounting magnetic transducer heads in close proximity to, but out of contact with, a magnetizable record surface.

In the art of recording and reproducing data or information by means of magnetic transducer heads mounted in close proximity to a moving magnetic record surface it is essential to maintain between the magnetic flux emitting pole pieces of the transducer head and the magnetizable record surface a spacing or air gap which is accurate, uniform from magnetic head to magnetic head, constant over a long period of time for any given magnetic head, and as narrow as possible, while preventing actual contact between the pole pieces and the record surface in order to minimize damage to both sets of components.

The air gap must be narrow in order to permit high density recording without spreading to adjacent tracks that may cause cross-talk, while supplying strong recording and playback characteristics. The air gap must be uniform from one magnetic head to another and must remain constant for any given head over a long period of time in order to provide uniform and constant recording and playback levels. Runout, wobble, thermal expansion and vibration of the support of the moving record surface destroy any attempt at recording high density magnetic data bits where transducer heads are fixedly mounted in such a way that they are prevented from following the irregularities of the record surface. The problem is further complicated in magnetic drum recording devices where the drum usually expands radially when in operation due to centrifugal growth adding its effect to thermally induced radial expansion.

It is well known that a rapidly moving record surface of the type commonly used in random access magnetic data recording devices, such as magnetic drums and discs, generates a laminar flow of the layer of air or gas fluid clinging to the record surface and set in motion by frictional interaction. The rapidly moving layer of fluid creates a hydrodynamic force that may be used to cause transducer heads resiliently supported from a fixed mounting to "fly" or float at a predetermined distance from the record surface.

The prior art discloses several modes by which magnetic transducer heads are thus caused to "fly." However many problems are encountered in devising fluid bearing means for supporting transducer heads, in providing adjustments of the transducer resilient support, precise alignment of the magnetic gaps, and fail safe mechanisms that prevent accidental contact between the transducers and the easily damaged magnetizable surface on the record medium. The transducer head must often be encased in a bearing pad in order to cause it to "fly," the adjustment of the parallelism of the bearing pad with the record surface is rather delicate, the adjustment of the biasing force tending to force the pad towards the record surface is critical and the longitudinal and lateral adjustments of the position of the magnetic gaps often lack precision.

The present invention does away with the inconveniences of previous so-called flying or aerodynamic magnetic transducer heads by providing an improved and novel means of supporting one or more transducer heads by way of two parallel adjustable spring reeds in combination with one flexible wire support. The present invention also provides positive longitudinal and lateral positioning of the magnetic gap in relation to a magnetic record surface.

It is therefore a principal object of the present invention to provide an improved device for positioning magnetic transducers close to, but out of contact from, a rapidly moving record surface.

It is another object of the present invention to provide an improved device for positioning magnetic transducers close to a moving record surface by utilizing the bearing action of the fluid flow caused by the motion of the record surface.

It is a further object of the invention to provide a magnetic transducer assembly which maintains a spacing from a record surface that remains constant in spite of any irregularities of the said surface.

It is yet a further object of the invention to provide a free floating transducer head assembly that is supported away from a fixed, although adjustable, mounting, by means of two parallel flat spring members and a resilient wire support forming a resiliently deformable support assembly maintaining at all time the magnetic gaps properly oriented and the transducer head bodies substantially normal to the record surface.

It is an additional object of the invention to provide a flying transducer head assembly having easily adjustable means for increasing or decreasing the biasing force urging the transducer heads towards the record surface and other adjustable means limiting the amount of travel of the transducers toward the record surface and preventing accidental contact between the transducer heads and the record surface.

It is yet another object of the invention to provide a transducer head assembly having the advantages above mentioned and which is easy and relatively cheap to manufacture, and substantially safe and troublefree to use.

Other objects and advantages will be pointed out in the following description and claims and in the accompanying drawings which illustrate, by way of example, the principle of the invention and the best mode which has been contemplated of applying that principle to a magnetic data storage device of the magnetic drum type, although it is obvious that the same principle could be adapted to a magnetic data storage device of the magnetic disc type.

Figure 1:
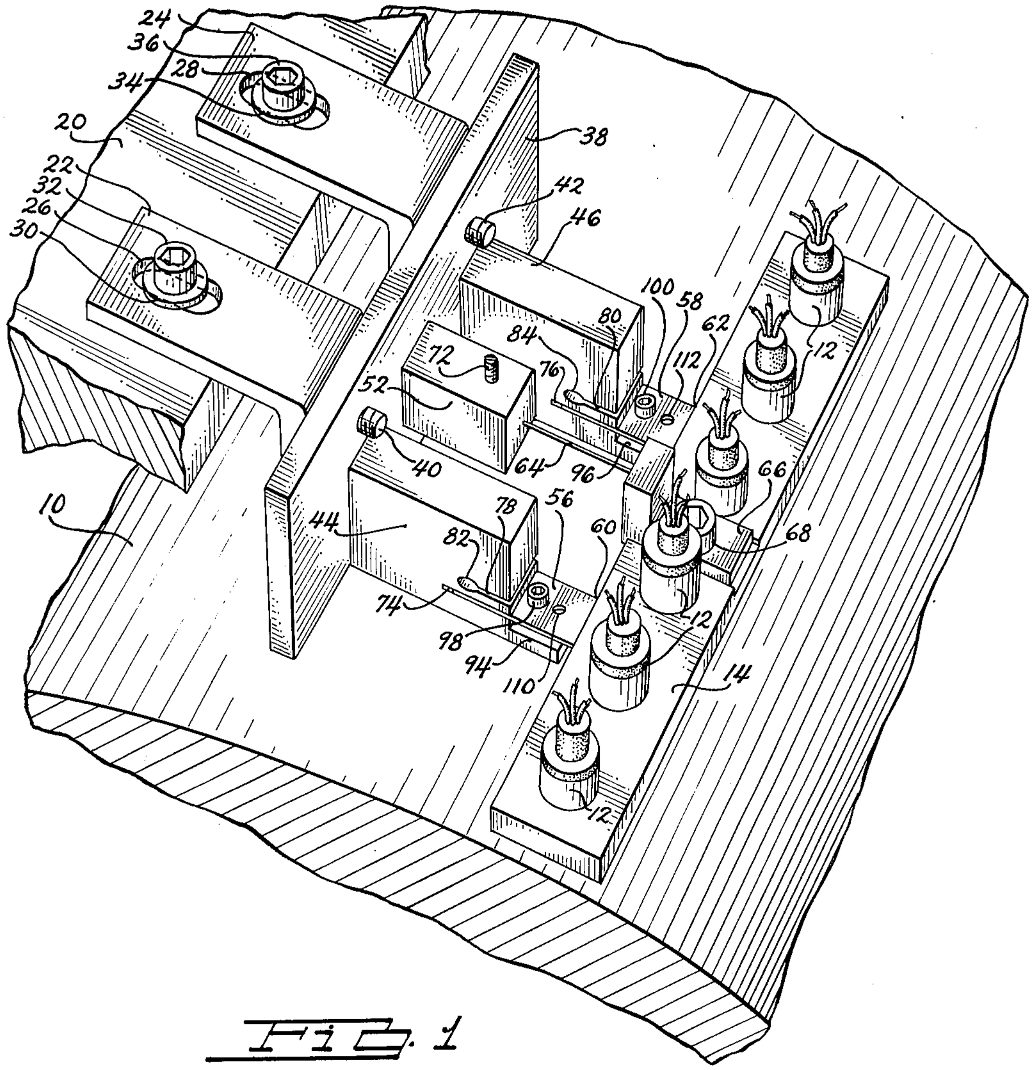
FIG. 1 represents a perspective view of one embodiment of the present invention, as contemplated to be used in combination with a magnetic drum.
Figure 2:
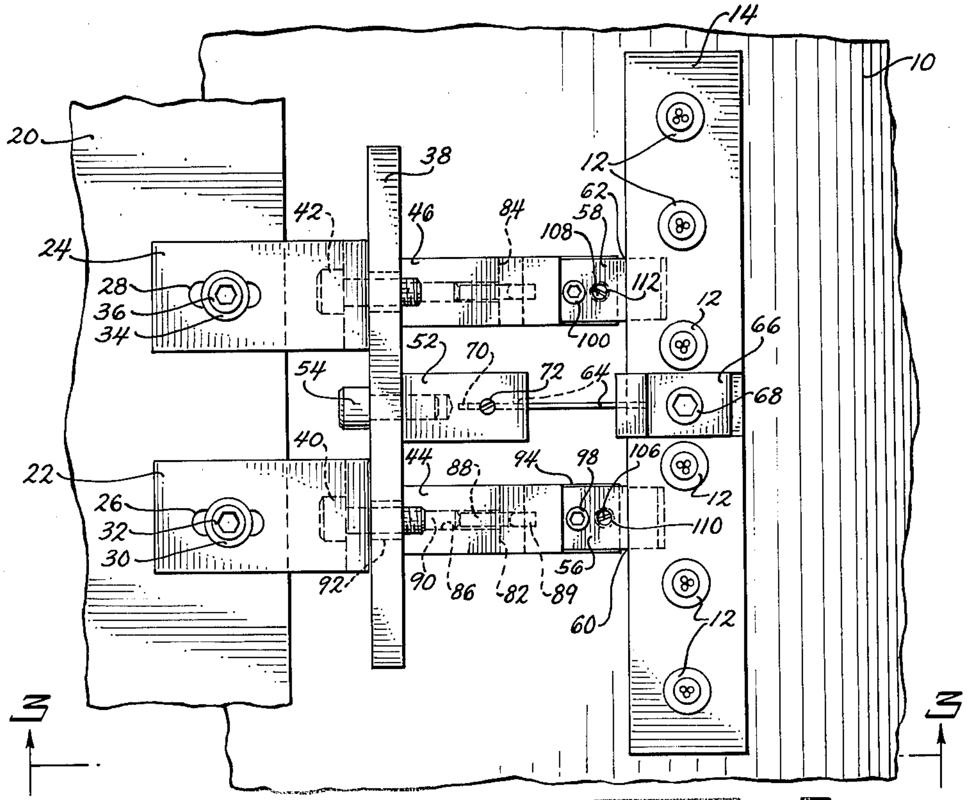
FIG. 2 is a top plan view of the embodiment of FIG. 1.
Figure 3:
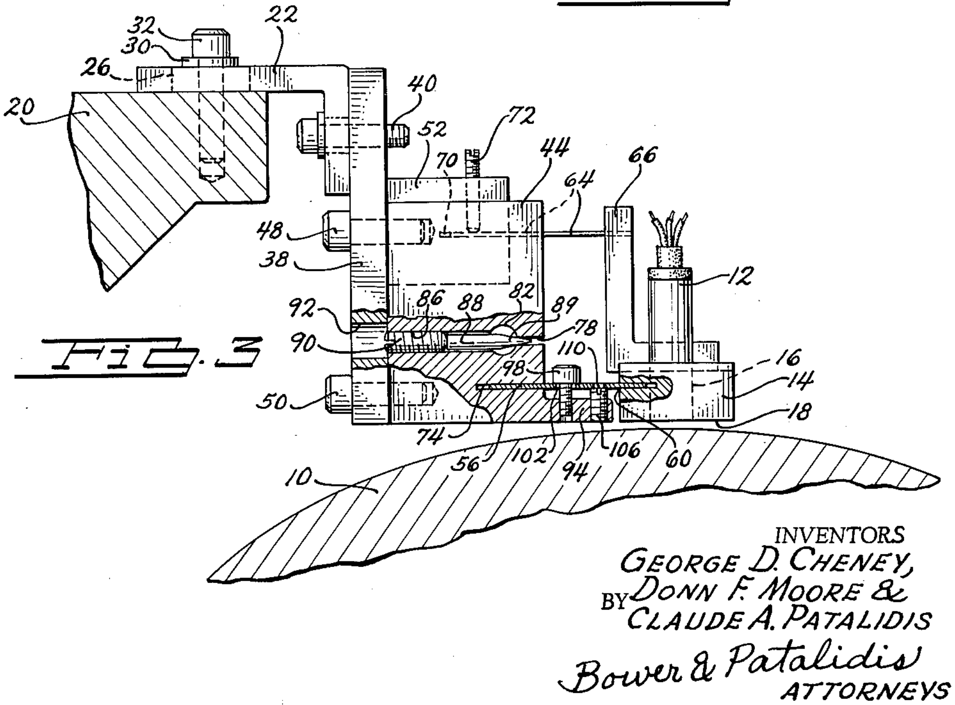
FIG. 3 is an end view from line 3—3 of FIG. 2, with portions broken away to show the internal construction.

With reference to the drawings which represent a portion of a magnetic data storage device, and in which like reference numerals indicate like parts, FIGS. 1–3 illustrate a rotatable drum 10 having a magnetizable surface upon which data can be recorded in the form of magnetized areas, from which data can be read, and from which data can be erased and replaced by new recorded data. The record, erase, and read operations are effected by means of a plurality of magnetic transducer heads 12 whose internal configuration is no part of the present invention and which may be similar in structure to the transducer heads disclosed in U.S. Patent No. 3,026,379 to David J. Carpenter and in co-pending application Serial No. 142,419, filed October 2, 1961 by Theodore C. Foster and Joseph E. Smith, Jr.

The magnetic transducer heads are supported by a bearing bar 14 having alined holes 16 into which the transducer bodies are inserted, with their pole pieces substantially flush with the bottom surface 18 of the bearing bar (FIG. 3). The transducer bodies are fastened in position by any suitable means such as soldering, cementing, or locking by a set screw.

The rotatable drum is at least partially surrounded by a stationary shroud or housing 20. Inverted L-shaped mounting brackets 22–24 are clamped upon the housing by means of the mounting holes 26 and 28 and the fastening washers and screws 30, 32, 34, and 36. A mounting plate 38 is supported by the mounting brackets by being fastened thereon by means of screws 40 and 42. On the mounting plate are fastened a pair of spring reed mounting blocks 44–46 by means of screws such as 48 and 50, and spring wire mounting block 52 by means of screw 54.

Spring reed mounting blocks 44 and 46 resiliently support the bearing bar 14 by way of the flat spring reeds 56 and 58, each having one of their ends clamped in the appropriate mounting block, as will be hereinafter explained in further details and their other end soldered, cemented or otherwise fastened to the edge of the bearing bar as indicated at 60 and 62. A spring wire 64 has one of its ends soldered, cemented, or otherwise fastened to an L-shaped bracket 66 which is in turn fastened to the bearing bar 14 by means of the screw or the like 68. The other end of spring wire 64 is inserted in a bore 70 in spring wire mounting block 52 and locked therein by a set screw 72.

Spring reeds 56 and 58 are substantially parallel and situate in a common plane. Spring wire 64 is substantially parallel to both spring reeds and substantially equidistant therefrom. The spring wire and the two spring reeds, in combination with their respective mounting blocks and the bearing bar, form a deformable triangular prism having a fixed triangular base and another triangular base susceptible of motion in two opposite directions only, namely toward and away from the record surface, thereby allowing the bearing bar 14 to be free to move toward and away from the record surface.

Spring reed mounting blocks 44 and 46 are respectively provided with slots 74 and 76 for insertion therein of one end of spring reeds 56 and 58. A second slot 78 is provided in block 44, and a similar second slot 80 is provided in block 46, ending respectively in transversal relief bores 82 and 84. Referring more particularly to FIGS. 2–3 where the means of adjustably clamping spring reed 56 in slot 74 of mounting block 44 are best shown, and keeping in mind the fact that identical means are provided for adjustably clamping spring reed 58 in slot 76 of mounting block 46, a longitudinal threaded bore 86 is provided substantially perpendicularly to the axis of relief bore 82. A plunger 88 having a wedge shaped end 89 is disposed within the threaded bore 86, with its wedge shaped end 89 partly projecting into slot 78. A set screw 90, whose head is accessible through hole 92 in mounting plate 38, is disposed at one end of plunger 88 for driving the wedge shaped end 89 further into slot 78, thereby securedly clamping the end of spring 56 in slot 74 by deformation of the material situated between slot 78 and slot 74.

Block 44 is provided with a projecting member 94 extending substantially parallel to the underface of spring reed 56. A screw 98, disposed through a hole 102 in spring reed 56 and threading through an appropriate tapped hole in projecting member 94 has its head capable of pressing upon the upper face of spring 56 in order to adjustably bias spring 56, thereby forcing the bottom surface 18 of bearing bar 14 toward the record surface. A stop screw 106, also threading into projecting member 94 and accessible through access hole 110 in spring reed 56, affords an adjustable abutment limiting the amount of permissible travel of the bottom surface 18 of bearing bar 14 in the direction of the record surface.

Block 46 is similarly provided with a projecting member, best seen in FIG. 1, and spring reed 58 is also provided with a biasing screw 100 and a stop screw 108 accessible through hole 112 in spring reed 58 (FIGS. 1–2).

The transducer head assembly is mounted as indicated with the transducer heads having their pole pieces flush with the bottom surface 18 of bearing bar 14 and their magnetic gap in correct alignment. The assembly is longitudinally and laterally adjustable for proper positioning of the bearing bar in relation to the surface of the drum and the magnetic tracks thereupon. The proportions and dimensions of the elements are such that the bottom surface 18 of the bearing bar 14 is normally a certain distance away from the record surface with screws 98 and 100 having their heads out of contact with the upper face of spring reeds 56 and 58, respectively, and the screws 106 and 108 not touching the underface of spring reeds 56 and 58. Bearing bar 14 is approximately parallel to a plane tangent to the surface of the drum.

Drum 10 is brought to operating speed and allowed to run at such speed for any period of time enabling the drum and other components to reach normal operating temperature and to become thermally and dynamically stabilized. Screws 98 and 100 are then drawn in, biasing springs 56 and 58 until the bottom surface of bearing bar 14 barely clears the surface of the drum. The laminar film of fluid flowing under surface 18 is now supporting the bearing bar against the biasing force of the spring reeds, and it is the equilibrium of the biasing force in one direction and of the lifting force of the fluid film in the opposite direction which maintains the bottom surface 18 of the bearing bar in close juxtaposition to, but out of contact from, the record surface.

Screws 98 and 100 are normally turned of the same amount in order to bias equally spring reeds 56 and 58. However, screws 98 and 100 may be differentially rotated in order to compensate for any tilting of bar 14 in relation to a plane tangent to the surface of the drum.

By observing, by means of an oscilloscope, the signals read by the transducers, the distance between surface 18 and the record surface may be adjusted for optimum performance and for parallelism. If necessary, screw 72 may be loosened and the free portion of spring wire 64 shortened or increased by sliding it in or out of bore 70; when a correct position has been found, spring wire 64 is then immobilized by again tightening screw 72.

Test signals need not be previously recorded on the magnetizable surface of the drum as the signals read by the transducers may simply be provided by the background noise always present even in a virgin magnetic coating.

If the rotation of the drum was now reduced, the velocity of the laminar film of fluid would also be reduced to a point where it could no longer sustain the bearing bar by its lifting action upon the surface 18. The centrifugally induced radial growth of the drum would also be reduced but not by such an amount that the surface 18 would be prevented from contacting the surface of the drum. To prevent contact between surface 18 and the magnetizable surface on the drum to occur, screws 106 and 103 are rotated until the upper surface of their head contacts the lower surface of spring 56 and 58, respectively. The screws 106 and 108 are then backed away slightly, by being turned a few degrees in the opposite direction, to prevent interfering with the free bending movements of the springs.

The drum can now be brought to a standstill without fear of the surface 18 of bar 14 ever touching the surface of the drum, as the permissible travel of the bar towards the drum is now limited by the stop or abutment of the heads of screws 106 and 108.

As a further precaution, the underface 18 of bearing bar 14 may advantageously be coated with an unctuous, smooth, non-abrasive composition, that would prevent damaging the magnetic surface in case of accidental contact therewith. Such a composition, may, for example, contain tetrafluoroethylene or a mixture of tetrafluorethylene and ceramics.

It can be seen by the above description that the transducer head bearing bar of the transducer head assembly of the invention is maintained yieldably in a radial direction relatively to the drum, whilst being maintained substantially firmly in a longitudinal and lateral direction due to the natural stiffness of the spring reeds to deflection in those planes. The bearing bar is prevented from tilting longitudinally by the action of the flexible wire.

It is obvious that expressions such as "upper," "lower," "top," "bottom," are relative terms and are herein used for the sake of simplifying the description of the invention in reference to the accompanying drawings, as it is evident that the transducer head assembly of the invention may be mounted in any position whatsoever.

Whilse there has been shown and described and pointed out the fundamental novel features of the invention as applied to the preferred embodiment, it will be understood that various omissions and changes and substitutions in the form and details of the device illustrated may be made by those skilled in the art without departing from the spirit and scope of the invention. Consequently, the invention herein disclosed is to be construed as limited only by the spirit and scope of the appended claims.

What is claimed as new is:

1. Apparatus for supporting at least one magnetic transducer a predetermined distance away from a moving record surface by utilizing the bearing fluid set in motion by the movement of said record surface, said apparatus comprising in combination: said magnetic transducer; a bearing bar for supporting said magnetic transducer with the flux emitting gap of said transducer substantially flush with the underface of said bearing bar; a pair of substantially flat resilient springs disposed spatially substantially in one plane approximately parallel to said underface, each of said flat resilient springs having one end fixably fastened to said bearing bar; the other end of each said flat resilient springs being fixably fastened to adjustable stationary mounting blocks; and an elongated rod element of wire stock having its axis substantially equidistant to said flat resilient springs and parallel to the plane of said flat resilient springs, the axis of said element positioned outwardly from the plane of said springs a distance at least equal to the width of one of said springs, one end of said element being fastened to said bearing bar and the other end of said element being adjustably slidable axially in a bore within an adjustable stationary block thereby allowing said element to resiliently deform in combination with said springs.

2. The apparatus of claim 1 wherein a first adjustable limit stop biases each of said flat springs toward said record surface, and a second limit stop adjustably limits the permissible travel of said bearing bar toward said record surface.

3. The apparatus of claim 1 wherein said underface is coated with an unctuous smooth plastic compound.

4. Apparatus for supporting at least one magnetic transducer a predetermined distance away from a moving record surface by utilizing the bearing fluid set in motion by the movement of said record surface, said apparatus comprising in combination: said magnetic transducer; a parallelepipedonal bearing bar for supporting said magnetic transducer with the flux emitting gap of said transducer substantially flush with the underface of said bearing bar; a pair of substantially flat resilient springs disposed spatially substantially in one plane approximately parallel to said underface and perpendicular to the longest axis of said bearing bar, each of said flat resilient springs having one end fastened to said bearing bar; the other end of each of said flat resilient springs being fastened to a stationary mounting block by being clamped in a first slot whose sidewall is deformable by the wedge end of a plunger adapted to be adjustably driven between the sidewalls of a second slot parallel said first slot; an elongated rod element of wire stock having its axis substantially equidistant to said flat resilient springs and parallel to the plane of said flat resilient springs, the axis of said element positioned outwardly from the plane of said springs a distance at least equal to the width of one of said springs, one end of said element being anchored within a bracket attached to said bearing bar and the other end of said element being slidable in a bore of a stationary mounting block for clamping in said bore by means of a set screw, so as to be adjustable in length allowing said element to resiliently deform in combination with said springs; and said mounting blocks being fastened to an adjustable support member.

5. The apparatus of claim 4 wherein the underface of said bearing bar is coated with an unctuous smooth plastic compound comprising ceramics and tetrafluoroethylene.

6. The apparatus of claim 4 wherein a first adjustable limit stop biases each of said flat springs toward said record surface, and a second limit stop adjustably limits the permissible travel of said bearing bar toward said record surface.

7. The apparatus of claim 6 wherein said first adjustable limit stop biasing each of said flat springs toward said record surface consists of a screw member introduced through a hole in each of said flat springs and threading into a member projecting from each of said mounting blocks and extending in spatial arrangement with said flat spring between said spring and the record surface, said screw member having a head disposed to engage the surface of said flat spring farthest removed from said record surface; and said second limit stop consists of a screw member threading into said projecting member and having a head adapted to engage the surface of said flat spring closest to said record surface, said screw member being reached for adjustment thereof through an access aperture in said flat spring.

8. Apparatus for supporting a plurality of magnetic transducers a predetermined distance away from a moving record surface by utilizing the bearing fluid set in motion by the movement of said record surface, said apparatus comprising in combination: said magnetic transducers; a bearing bar for supporting said magnetic transducers with the flux emitting gaps of said transducers disposed substantially flush with the face of said bearing bar confronting the record surface and on a line along the longest axis of said bearing bar; a pair of flat flexible spring reeds disposed spatially substantially in one plane approximately parallel to said face of the bearing bar confronting the record surface, each of said reeds having one end fastened to said bearing bar; the other end of said reeds being fastened to a mounting block fastened in turn to an adjustable support member; an elongated rod element of wire stock having its axis substantially equidistant to said reeds and parallel to the plane of said reeds, the axis of said element positioned outwardly from the plane of said reeds a distance at least equal to the width of one of said reeds, one end of said element being fastened to said bearing bar and the other end being slidable axially in a bore within a mounting block so as to render the length of said wire adjustable thereby allowing said element to resiliently deform in combination with said reeds, said mounting block being in turn fastened to said adjustable mounting member.

9. The apparatus of claim 8 wherein a first adjustable abutment biases each of said reeds toward said record surface, and a second adjustable abutment substantially proximate to the bearing bar limits the permissible deflection of said reeds toward said record surface.

10. The apparatus of claim 8 wherein the face of said bearing bar confronting the record surface is coated with an unctuous smooth plastic compound.

References Cited by the Examiner

UNITED STATES PATENTS

| | | | |
|---|---|---|---|
| 2,862,781 | 12/1958 | Baumeister | 340—174.1 |
| 2,863,004 | 12/1958 | Maclay | 179—100.2 |
| 2,905,933 | 9/1959 | Canepa | 179—100.2 |
| 2,961,494 | 11/1960 | Daron | 340—174.1 |

FOREIGN PATENTS

| | | |
|---|---|---|
| 842,509 | 7/1960 | Great Britain. |

IRVING L. SRAGOW, *Primary Examiner.*

R. J. McCLOSKEY, *Examiner.*

P. F. ROTH, *Assistant Examiner.*